(12) United States Patent
Giez

(10) Patent No.: US 6,257,975 B1
(45) Date of Patent: Jul. 10, 2001

(54) VENTILATION DEVICE FOR VEHICLES

(75) Inventor: Stefan Giez, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/484,013

(22) Filed: Jan. 18, 2000

(30) Foreign Application Priority Data

Jan. 16, 1999 (DE) ............................................. 199 01 582

(51) Int. Cl.⁷ .................................................... B60S 1/54
(52) U.S. Cl. ....................................................... 454/127
(58) Field of Search ............................. 454/85, 93, 121, 454/127, 198

(56) References Cited

U.S. PATENT DOCUMENTS

| | | | |
|---|---|---|---|
| 2,894,443 | * 7/1959 | Rasmussen | 454/127 |
| 3,608,469 | 9/1971 | Mutoh et al. | 454/127 |
| 4,223,754 | 9/1980 | Mizuno et al. | 180/90 |
| 5,173,078 | * 12/1992 | Robin et al. | 454/127 X |
| 6,062,298 | * 5/2000 | Lee | 454/127 X |

FOREIGN PATENT DOCUMENTS

| | | | |
|---|---|---|---|
| 0 713 792 | 5/1996 | (EP) | . |
| 2 608 520 | 6/1988 | (FR) | . |
| 2 623 776 | 6/1989 | (FR) | . |
| 1040469 | 8/1966 | (GB) | . |
| 2 139 749 | 11/1984 | (GB) | . |
| 55-31652 | * 3/1980 | (JP) | 454/127 |

* cited by examiner

Primary Examiner—Harold Joyce
(74) Attorney, Agent, or Firm—Evenson, McKeown, Edwards & Lenahan, P.L.L.C.

(57) ABSTRACT

A ventilation device for an interior of a vehicle provided with a windshield and instrument panel has a plurality of air outlet openings provided side by side in the instrument panel close to the windshield in two rows, one behind the other as viewed in the travel direction. To ensure freedom from precipitation on a large windshield without adversely affecting climate comfort in the interior, each row of air outlet openings is connected to one of two separate supply channels and the air supply channel that leads to the front row receives warm air conditioned to a higher temperature than the air supply channel that leads to the back row.

12 Claims, 3 Drawing Sheets

VENTILATION DEVICE FOR VEHICLES

BACKGROUND OF THE INVENTION

This application claims priority of DE 199 01 582.1, filed Jan. 16, 1999, the disclosure of which is expressly incorporated by reference herein.

The invention relates to a ventilation device for an interior of a vehicle provided with a windshield and instrument panel, with a plurality of air outlet openings in the instrument panel close to windshield, said openings being arranged side by side in two rows, behind one another as viewed in the direction of travel.

In a known ventilation device of this kind (U.S. Pat. No. 3,608,469) the air outlet openings serve as defroster nozzles to keep the windshield free of precipitation and are connected to a common warm air duct. As a result of the separate blowing of the warm air, vortices and dynamic vacuum zones are formed in the outlet area from two air openings located one behind the other, said zones combining the two separate air streams into a narrow stream that blows deliberately against the windshield, intensifying the effect of the precipitation removal and the carrying away of moisture at the windshield.

In modern automobiles, increasingly flat windshields are steadily increasing the height or length of the windshield. The air flowing along the windshield has a greater cooling effect because of the greater length. To guarantee that the windshield is kept free of precipitation, when the ambient temperature is cooler air with a relatively high temperature must be blown out of the air outlet openings. This considerably heated air also flows into the air space above the instrument panel and toward the heads of the passengers. For climate comfort in the interior, however, it is desirable to have a warm foot area and a cool upper air space in the head area.

A goal of the invention is to provide a ventilation device of the type described at the outset which reliably keeps large-area windshields free of precipitation and also guarantees customary climate comfort in the interior.

This goal is achieved according to the invention by providing a ventilation device of the above-noted type, wherein each row of air outlet openings is connected to one of two separate air supply channels and that the air supply channel that runs to the front row is subjected to a flow of warm air conditioned to higher temperature than the air supply channel that leads to the back row.

The ventilation device according to the invention has the advantage that the air, heated to a greater degree, coming from the front air outlet openings close to the windshield is applied as a warm air film to the windshield and keeps it free of precipitation while the cooler air flow from the rear air outlet openings located closer to the vehicle occupants reaches the upper air space and produces the desired climate comfort there.

Advantageous embodiments of the ventilation device according to the invention with appropriate designs and improvements to the invention are described herein and in the claims.

Other objects, advantages and novel features of the present invention will become apparent from the following detailed description of the invention when considered in conjunction with the accompanying drawings.

DETAILED DESCRIPTION OF THE DRAWINGS

Figure 1:
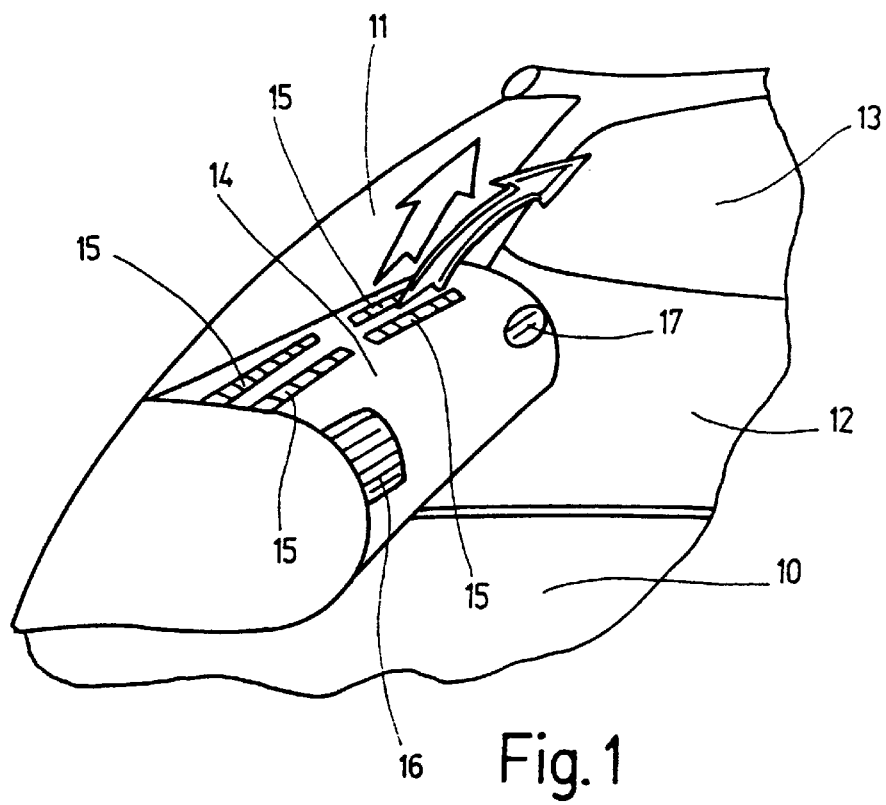
FIG. 1 shows, in part, a perspective view of a front area of an interior of an automobile with a windshield and instrument panel located beneath, constructed according to preferred embodiments of the present invention.

FIG. 1 shows schematically, in part, the front area of an interior 10 or of a passenger compartment of an automobile. As is known, interior 10 is closed off by a windshield 11 and on the side by vehicle doors 12 with side windows 13. An instrument panel 14 is located beneath the windshield 11 and extends along the bottom edge of windshield 11 over the entire width of interior 10. A ventilation device for interior 10 has a plurality of air outlet openings 15 provided in instrument panel 14 close to windshield 11 and additional air nozzles 16 and 17 recessed into instrument panel 14. The latter are known as center nozzles 16 and side nozzles 17.

Figure 2:
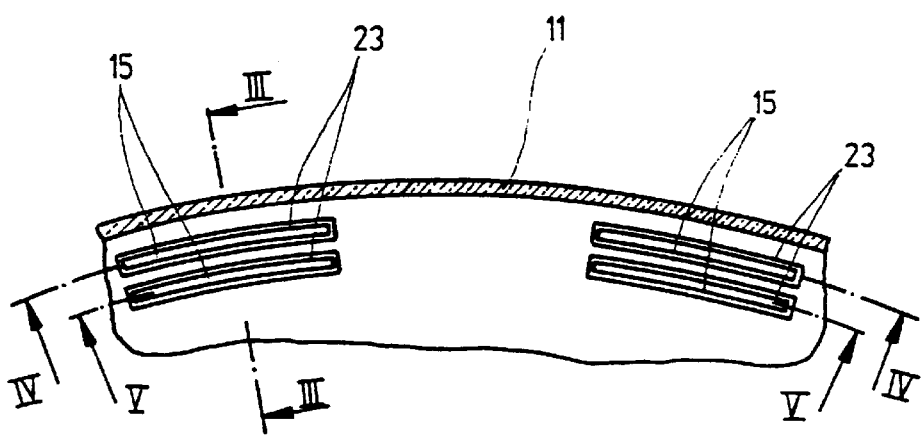
FIG. 2 is a partial top view of the instrument panel of FIG. 1.
Figure 3:
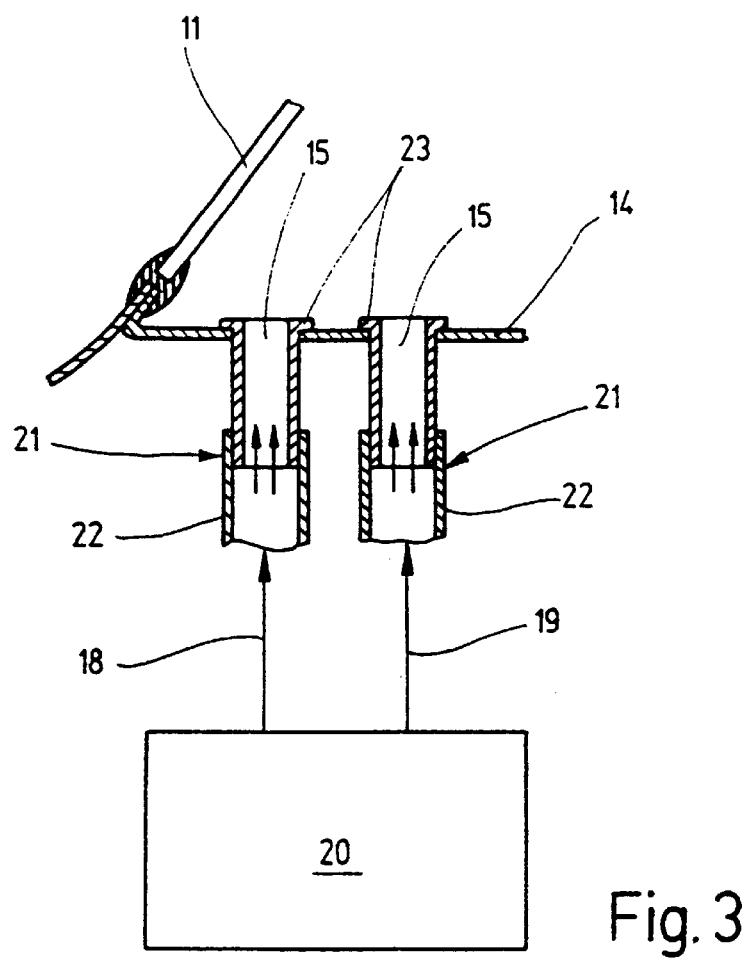
FIG. 3 is a sectional view along section line III—III in FIG. 2.
Figure 4:
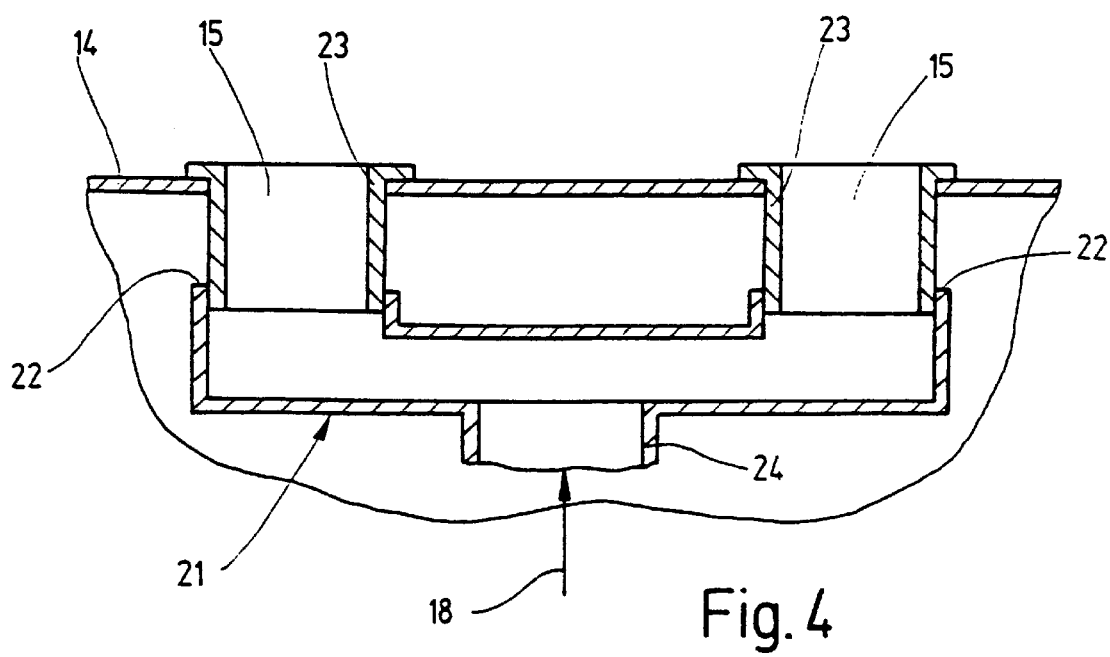
FIG. 4 is a sectional view along section line IV—IV in FIG. 2.
Figure 5:
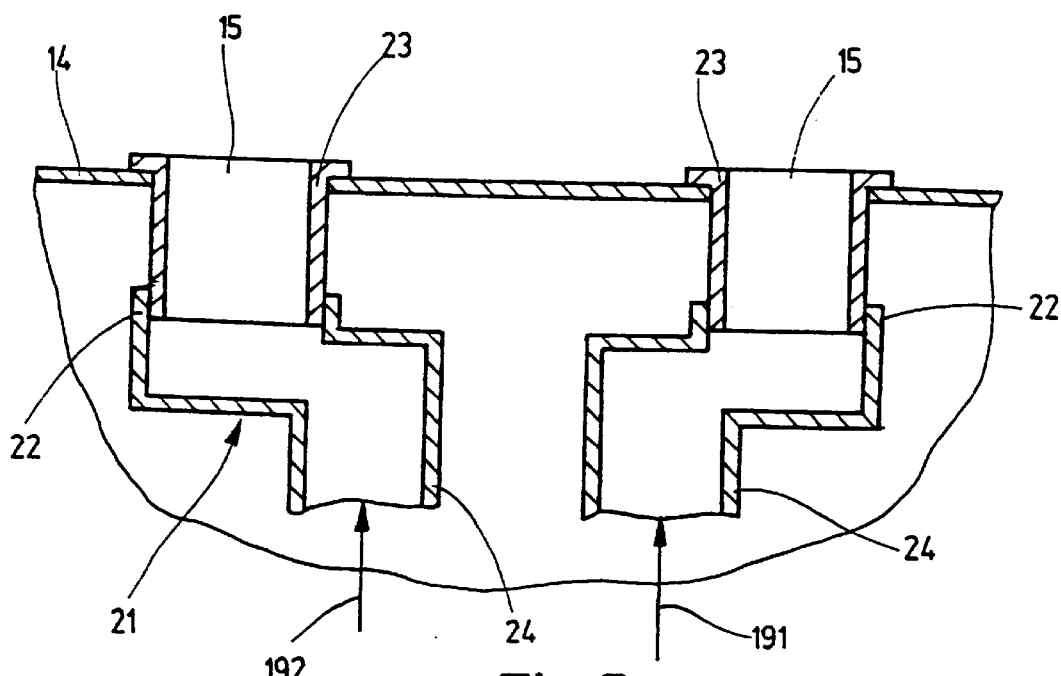
FIG. 5 is a sectional view along section line V—V in FIG. 2.

Air outlet openings 15 are located side by side in two rows, behind one another looking in the direction of travel. At least two air outlet openings 15 are provided in each row (FIG. 2). As the sectional views in FIGS. 3 to 5 show, the (at least two) air outlet openings 15 in a row are each connected to one of two separate air supply channels 18, 19 that lead to the air conditioning chamber 20 of an air conditioner and are exposed there to air at different temperatures. Each air supply channel 18 or 19 is connected to the associated air outlet openings 15 in the front or back rows for example by a pot-shaped distributor 21 (FIGS. 3–5) mounted air-tight with at least two outlet stubs 22 on nozzle housing 23 which in turn are inserted from the top of instrument panel 14 into each of the air outlet openings 15. The end of air supply channel 18 or 19 is pushed onto an inlet stub 24 formed in one piece on distributor 21. For the sake of simplicity, the air guide channels 18 and 19 are symbolized by arrows between distributors 21 and air conditioning chamber 20.

Air supply channel 18 is supplied with considerably heated air through an air distributor in the air conditioning chamber 20. This air flows out through the air outlet openings 15 located in the vicinity of windshield 11 and is applied as a warm film of air to windshield 11. This warm air film at relatively high temperature ensures that a considerable area of windshield 11 is free of precipitation. Air supply channel 19 on the other hand is supplied with air that has been conditioned to meet comfort conditions and which flows through the air outlet openings located in the back row closer to the passengers into the vehicle space above instrument panel 14, where it reaches the head area of the passengers. This conditioned air flow supplies the head area of interior 10 with air that has been conditioned to meet comfort conditions and which is conventionally cooler than the air that flows into the foot area of interior 10, thus guaranteeing good climate comfort for the passengers and preventing the considerably heated warm air film at windshield 11 from being directed at the head area of the passengers.

Since the air supply to the passenger compartment is separated for comfort reasons to the driver and passenger sides of the vehicle interior, as shown in FIG. 5 the air supply channel 19 is divided into two separate channels 191 and 192, each of which is guided to an inlet stub 24 of distributor 21. Each inlet stub 24 is connected with at least one outlet stub 22 into which a nozzle housing 23 is inserted for the left-hand or right-hand side of the vehicle. The air supply of the considerably heated air to the windshield 11 on the other hand does not have to be supplied separately so that only a single air supply channel 18 is provided, as shown in the sectional view in FIG. 4.

Figure 6:
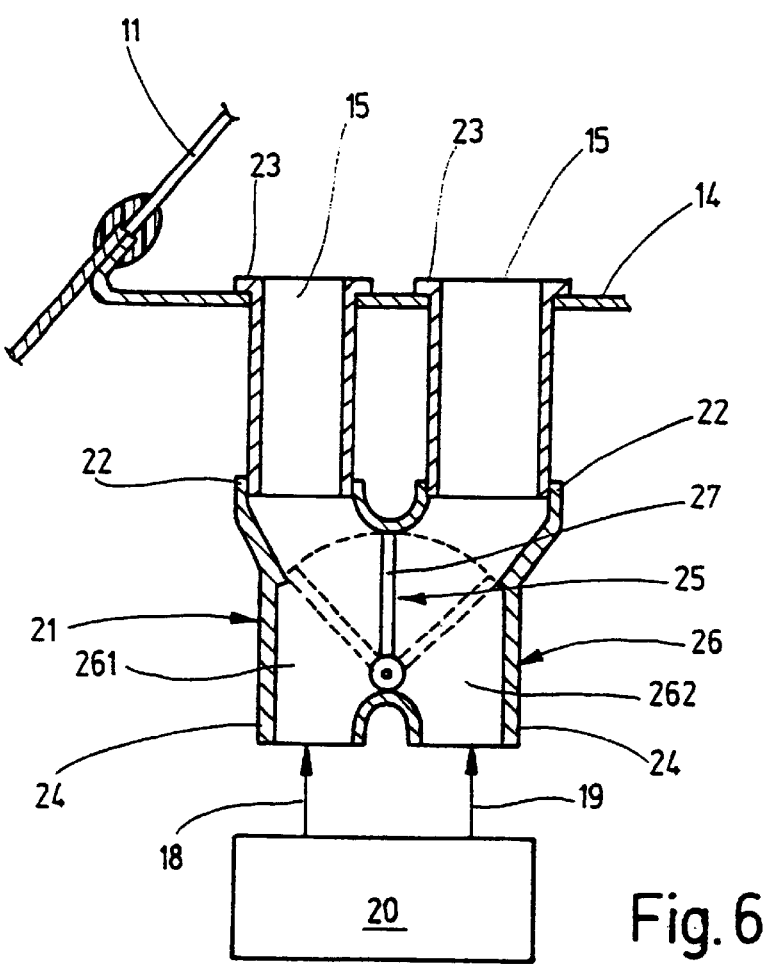
FIG. 6 is similar to FIG. 3 showing an embodiment with an air switch in the air supply.

In the modified ventilation device according to FIG. 6, an air switch 25 is located in the connection of the air outlet openings 15 to the air supply channels 18 and 19 so that all the air outlet openings 15 can also be connected optionally to one air guide channel 18 or 19 or the other. For this purpose, air switch 25 has a hose tube 26, both of whose legs 261 and 262 provide the connections between the front and back rows of air outlet openings 15 and one of the air supply channels 18 or 19. An air flap 27 is pivotably mounted in the middle of hose tube 26 in such fashion that in its central basic position it separates hose legs 261 and 262 from one another and in its two pivot end positions shown by dashed lines in FIG. 6, it connects optionally the two rows of air outlet openings 15 with one air supply channel 18 or 19 or the other. In the left-hand pivot end position represented by the dashed lines in FIG. 6, the pivot flap 27 is closed off together with the air supply channel 18 connected with stub 24 and all the air outlet openings 15 are connected with air supply channel 19 for the conditioned air supply while in the right-hand pivot end position of air flap 27 represented by the dashed lines in FIG. 6, the inlet stub 24 connected with air supply channel 19 is shut off and all air supply channels 15 are connected with the air supply channel 18 that carries the air heated to a greater extent. Pivot flap 27 can be operated manually or by an automatic adjusting mechanism.

Alternatively, the air outlet openings in each row can be combined into a continuous slot which extends over the entire width of instrument panel 14 with each slot possibly being covered by a trim grid.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Ventilation device for an interior of a vehicle provided with a windshield and an instrument panel with a plurality of air outlet openings in the instrument panel adjacent to the windshield, said openings being arranged side by side in two rows, behind one another as viewed in the direction of travel,
   wherein each row of air outlet openings is connected to one of two separate air supply channels,
   wherein the air supply channel that runs to the front row is subjected to a first flow, of warm air conditioned to a higher temperature than a second flow of air while the air supply channel that leads to the back row is subjected to said second flow, and wherein the first and second flows flow simultaneously.

2. Ventilation device according to claim 1, wherein the air supply channels are connected to an air conditioning chamber of an air conditioner, and wherein the air that flows in the air supply channel that leads to the back row of the air outlet openings, is conditioned for comfort reasons, and wherein the air that flows through the air supply channel that leads to the front row of air outlet openings is heated to a considerable extent.

3. Ventilation device according to claim 1 wherein the air outlet openings of each row are combined into a continuous slot.

4. Ventilation device according to claim 2 wherein the air outlet openings of each row are combined into a continuous slot.

5. Ventilation device according to claim 1, wherein the air supply channel that leads to the back row of air outlet openings is divided into two separate air channels for separate air supply to right-hand and left-hand sides of the vehicle interior, with each of these air channels being connected to at least one of the air outlet openings in the back row that are located on the right-hand and left-hand halves of the instrument panel.

6. Ventilation device according to claim 2, wherein the air supply channel that leads to the back row of air outlet openings is divided into two separate air channels for separate air supply to right-hand and left-hand sides of the vehicle interior, with each of these air channels being connected to at least one of the air outlet openings in the back row that are located on the right-hand and left-hand halves of the instrument panel.

7. Ventilation device for an interior of a vehicle provided with a windshield and an instrument panel with a plurality of air outlet openings in the instrument panel adjacent to the windshield, said openings being arranged side by side in two rows, behind one another as viewed in the direction of travel,
   wherein the air outlet openings in the front and back rows are connected by a switchable air switch with two air supply channels charged with warm air conditioned to higher and lower temperatures,
   wherein the air switch is so designed that in a basic position of the air switch the air outlet openings of the front row are connected to the air supply channel subjected to the warm air conditioned to higher temperature, and the air outlet openings of the back row are connected to the air supply channel subjected to the warm air conditioned to a lower temperature thereby capable of producing two air flows of different temperatures at the same time, and
   wherein, in two switching positions of the air switch all the air outlet openings can be connected alternately to one air supply channel or the other.

8. Ventilation device according to claim 7, wherein the air switch comprises:
   a hose tube with two hose legs, both of the hose legs producing a connection between an air supply channel and the front and back rows of the air outlet openings, and
   an air flap pivotably located centrally in the hose tube which in its central basic position separates the hose legs from one another and in its two pivot end positions alternately connects the two rows of air outlet openings with one air supply channel or the other.

9. A vehicle windshield ventilating assembly comprising,
   first and second air outlet openings adjacent a vehicle windshield, said first air outlet opening being disposed in use closer to the windshield than said second air outlet opening,
   a first air supply channel operable to supply air to the first air outlet opening at a first temperature, and
   a second air supply channel operable to supply air to the second air outlet opening at a second temperature which is lower than the first temperature while said first air supply channel supplies air to the first air outlet opening at the first temperature.

10. An assembly according to claim 9, comprising an air conditioning unit operable to produce the respective first and second air supplies and a switchable valve operable to selectively control flow of the first and second air supplies to the first and second air outlet openings.

11. A vehicle comprising a windshield at a forward end of a vehicle interior passenger space and a vehicle windshield ventilating assembly, said ventilating assembly comprising:

first and second air outlet openings adjacent a vehicle windshield, said first air outlet opening being disposed in use closer to the windshield than said second air outlet opening, a first air supply channel operable to supply air to the first air outlet opening at a first temperature, and a second air supply channel operable to supply air to the second air outlet opening at a second temperature which is lower than the first temperature while said first air supply channel supplies air to the first air outlet opening at the first temperature.

12. A vehicle according to claim 11, comprising an air conditioning unit operable to produce the respective first and second air supplies, and a switchable valve operable to selectively control flow of the first and second air supplies to the first and second air outlet openings.

* * * * *